US011809877B2

(12) United States Patent
Vajravel et al.

(10) Patent No.: US 11,809,877 B2
(45) Date of Patent: Nov. 7, 2023

(54) DYNAMICALLY TUNING A COMPUTING DEVICE'S PERFORMANCE FOR A CONTAINERIZED APPLICATION

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 261 days.

(21) Appl. No.: 17/391,349

(22) Filed: Aug. 2, 2021

(65) Prior Publication Data
US 2023/0031198 A1 Feb. 2, 2023

(51) Int. Cl.
*G06F 9/4401* (2018.01)
*G06F 9/455* (2018.01)

(52) U.S. Cl.
CPC ........ *G06F 9/4411* (2013.01); *G06F 9/45558* (2013.01); *G06F 2009/4557* (2013.01); *G06F 2009/45583* (2013.01)

(58) Field of Classification Search
CPC .............. G06F 9/45558; G06F 9/5077; G06F 2009/4557; G06F 16/27; G06F 11/3452; G06F 9/4411; G06F 2009/45583; G06F 9/45533
See application file for complete search history.

(56) References Cited

U.S. PATENT DOCUMENTS

| | | | |
|---|---|---|---|
| 8,161,173 B1 * | 4/2012 | Mishra | G06F 9/468 709/227 |
| 10,284,670 B1 * | 5/2019 | Roche | H04L 67/125 |
| RE48,680 E * | 8/2021 | Yemini | G06Q 10/06 |
| 2008/0250429 A1 * | 10/2008 | Lockhart | G06F 3/038 719/320 |
| 2009/0257571 A1 * | 10/2009 | Lamberton | H04L 69/18 379/93.05 |
| 2014/0122875 A1 * | 5/2014 | Pizi | G06F 21/33 713/164 |
| 2016/0330138 A1 * | 11/2016 | Thomason | H04L 67/10 |
| 2017/0353433 A1 * | 12/2017 | Antony | H04L 49/70 |
| 2018/0121242 A1 * | 5/2018 | Zhang | G06F 9/5011 |
| 2018/0349168 A1 * | 12/2018 | Ahmed | G06F 11/3006 |

(Continued)

*Primary Examiner* — Faisal M Zaman
(74) *Attorney, Agent, or Firm* — KIRTON MCCONKIE; Brian Tucker

(57) ABSTRACT

A computing device's performance can be dynamically tuned for a containerized application. A dynamic tuning solution can be configured to identify target applications that are running in workspaces implemented using containers, including when a target application is moved between workspaces and when a workspace's context is changed. The dynamic tuning solution can create mappings between identifiers of the container and a performance level associated with the target applications. A driver can then use these mappings to ensure that the computing device is dynamically tuned to the performance level associated with the target application when the container hosting the target application is active. The dynamic tuning solution can also reconcile discrepancies between a performance level associated with a target application and a performance level associated with a workspace in which the target application is containerized.

20 Claims, 15 Drawing Sheets

(56) References Cited

U.S. PATENT DOCUMENTS

| | | | |
|---|---|---|---|
| 2019/0104403 A1* | 4/2019 | Sharma | H04L 67/148 |
| 2019/0391898 A1* | 12/2019 | Vichare | G06F 9/44505 |
| 2020/0026639 A1* | 1/2020 | Mola | G06F 11/3636 |
| 2020/0036796 A1* | 1/2020 | Tollet | H04L 12/4633 |
| 2021/0076444 A1* | 3/2021 | Shu | H04W 8/08 |
| 2021/0294597 A1* | 9/2021 | Nasu | G06F 8/77 |
| 2021/0349747 A1* | 11/2021 | Albasheir | G06F 11/302 |

* cited by examiner

Dynamic Tuning Participant Table 401

| Participant ID | CPU Power Levels | GPU Power Levels | Battery Discharge Rate |
|---|---|---|---|
| ID1 | PL1 = 50W<br>PL2 = 80W | PL1 = 25W<br>PL2 = 40W | 8C |
| ID2 | PL1 = 45W<br>PL2 = 75W | PL1 = 20W<br>PL2 = 35W | 7.5C |
| ... | ... | ... | ... |

Application Context Table 402

| Application Name | Context | Participant ID |
|---|---|---|
| Word | Security | ID2 |
| Zoom | Performance | ID1 |
| Chrome | Performance | ID1 |
| Solidworks | Performance | ID1 |
| Excel | Security | ID2 |
| ... | ... | ... |

*FIG. 4A*

Workspace Context Table 403

| Workspace | Context | Participant ID |
|---|---|---|
| Workspace1 | Performance | ID1 |
| Workspace2 | Security | ID2 |
| Workspace3 | Security | ID2 |
| Workspace4 | Undefined | Undefined |
| ... | ... | ... |

Application Container Table 404

| Application Name | Container Type | Execution ID |
|---|---|---|
| Word | Hardware | Container 302 VMCS Identifier |
| Zoom | Software | Container 301 PID |
| Chrome | None | Chrome PID |
| Solidworks | Software | Container 301 PID |
| Excel | Hardware | Container 302 VMCS Identifier |
| ... | ... | ... |

*FIG. 4B*

DYNAMICALLY TUNING A COMPUTING DEVICE'S PERFORMANCE FOR A CONTAINERIZED APPLICATION

CROSS-REFERENCE TO RELATED APPLICATIONS

N/A

BACKGROUND

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 110. Application 121 is an example of an application that is not containerized in that it relies on binaries/libraries 120 to interface directly with host operating system 110 (i.e., application 121 is a native application). In contrast, applications 122-125 are examples of containerized applications.

Applications 122 and 123 represent examples in which containerization is implemented using software virtualization. Examples of solutions that implement containerization through software virtualization include Docker and FreeBSD Jails. As represented in FIG. 1, each application 122 and 123 and its binaries/libraries 131a and 131b may be isolated within its own container 132 that is executed via a docker engine 130 that runs on host operating system 110.

Applications 124 and 125 represent examples in which containerization is implemented using hardware virtualization. Examples of solutions that implement containerization through hardware virtualization include Intel Clear Containers, Hyper-V Docker and Qubes OS. As represented in FIG. 1, with hardware-based containers, a uni/mini kernel 140 is executed on hypervisor 102. A docker engine 141 can then be run on uni/mini kernel 140 to containerize applications 124 and 125 and their respective binaries/libraries 142a and 142b. Hardware-based containers are oftentimes used to host untrusted applications (because they provide hardware isolation) or applications requiring a different operating system than host operating system 110.

These containerization techniques could also be used in a cloud context. For example, computing device 100 could represent a server that allows user computing devices to access applications 121-125 via virtual desktop infrastructure techniques.

It is becoming more common for an enterprise to use containerization solutions to run applications on computing devices that its employees may use. A primary benefit of employing containerization solutions is that it enables the applications to be deployed and launched from a cloud-based management server or other centralized repository as opposed to being installed on the computing devices as native applications. As a result, the employees can launch the applications on a variety of computing devices such as a work computer, a home computer, a smart phone, etc.

Some hardware platforms provide a "dynamic tuning framework" by which power can be automatically allocated between a CPU and a GPU to optimize performance and improve battery life. For example, Intel provides a dynamic tuning framework known as Dynamic Tuning Technology (DTT). A dynamic tuning framework allows an OEM, such as Dell or HP, or other provider to develop a dynamic tuning solution for dynamically adjusting the steady state power (PL1) and maximum power (PL2) of the CPU and GPU and setting a battery discharge rate, among other things. In this specification, such functionality will be referred to as "dynamically tuning a computing device's performance." Dynamic tuning solutions exist for leveraging a dynamic tuning framework to dynamically tune a computing device's performance based on a particular application/workload. However, such dynamic tuning solutions do not work when applications are run in containers because the containers hide the applications from the dynamic tuning solutions.

BRIEF SUMMARY

The present invention extends to systems, methods and computer program products for dynamically tuning a computing device's performance for a containerized application. A dynamic tuning solution can be configured to identify target applications that are running in workspaces implemented using containers, including when a target application is moved between workspaces and when a workspace's context is changed. The dynamic tuning solution can create mappings between identifiers of the container and a performance level associated with the target applications. A driver can then use these mappings to ensure that the computing device is dynamically tuned to the performance level associated with the target application when the container hosting the target application is active. The dynamic tuning solution can also reconcile discrepancies between a performance level associated with a target application and a performance level associated with a workspace in which the target application is containerized.

In some embodiments, the present invention may be implemented as a method for dynamically tuning a computing device's performance for a containerized application. One or more applications that are hosted in a first container can be identified. An execution ID for the first container can be identified. The execution ID for the first container can be associated with a first performance level. The execution ID for the first container can be used to detect when the one or more applications are active on the computing device. In response to detecting when the one or more applications are active on the computing device, the computing device's performance can be dynamically tuned to the first performance level.

In some embodiments, the present invention may be implemented as a computing device that includes a CPU, a GPU and computer storage media storing computer executable instructions which when executed implement an agent, a container service that executes in a container with one or more applications and a driver. The agent may be configured to perform a method for dynamically tuning the CPU and the GPU for the one or more applications. The agent can communicate with the container service to identify the one or more applications. The agent can identify an execution ID for the container. The agent can create a mapping between the execution ID for the first container and a first performance level. The agent can provide the mapping to the driver to thereby enable the driver to cause the CPU and the GPU to be dynamically tuned to the first performance level when the driver detects, using the execution ID for the first container, when the one or more applications are active on the computing device.

In some embodiments, the present invention may be implemented as computer storage media storing computer executable instructions which when executed implement a method for dynamically tuning a computing device's performance for a containerized application. One or more applications that are hosted in a first container can be identified. An execution ID for the first container can also be identified. A mapping can be created between the execution ID for the first container and a first performance level. The mapping can be provided to a driver to thereby enable the driver to cause the computing device's performance to be dynamically tuned to the first performance level when the driver detects, using the execution ID for the first container, when the one or more applications are active on the computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A and 4B provide examples of various tables that a dynamic tuning solution could use in one or more embodiments of the present invention;

DETAILED DESCRIPTION

Embodiments of the present invention encompass techniques for dynamically tuning a computing device's performance for a containerized application. These embodiments should not be limited by how or why an application is containerized. For example, embodiments of the present invention may be implemented when an application is consistently hosted in a static container. Embodiments of the present invention may also be implemented when an application is hosted in a container that implements a workspace including embodiments when the workspace may be dynamically changed based on context. Embodiments of the present invention may also be implemented when an application is moved between containers. In short, embodiments of the present invention enable a computing device's performance to be dynamically tuned for an application that is hosted in a container even though the container hides the application from a dynamic tuning solution.

In this specification and the claims, the term "workspace" will be used to reference a theme by which containerized applications are grouped. Examples of workspaces (or themes) include a performance workspace (e.g., a container that is configured to optimize the performance of the applications running in the container), a security workspace (e.g., a container that is configured to optimize the security of the applications running in the container), a hardware-enabled workspace (e.g., a container that is configured to enable the applications running in the container to access peripherals or other hardware), a corporate workspace (e.g., a container customized for a workplace environment), a home workspace (e.g., a container customized for a home environment), a public workspace (e.g., a container customized for a public environment), etc.

Figure 1:
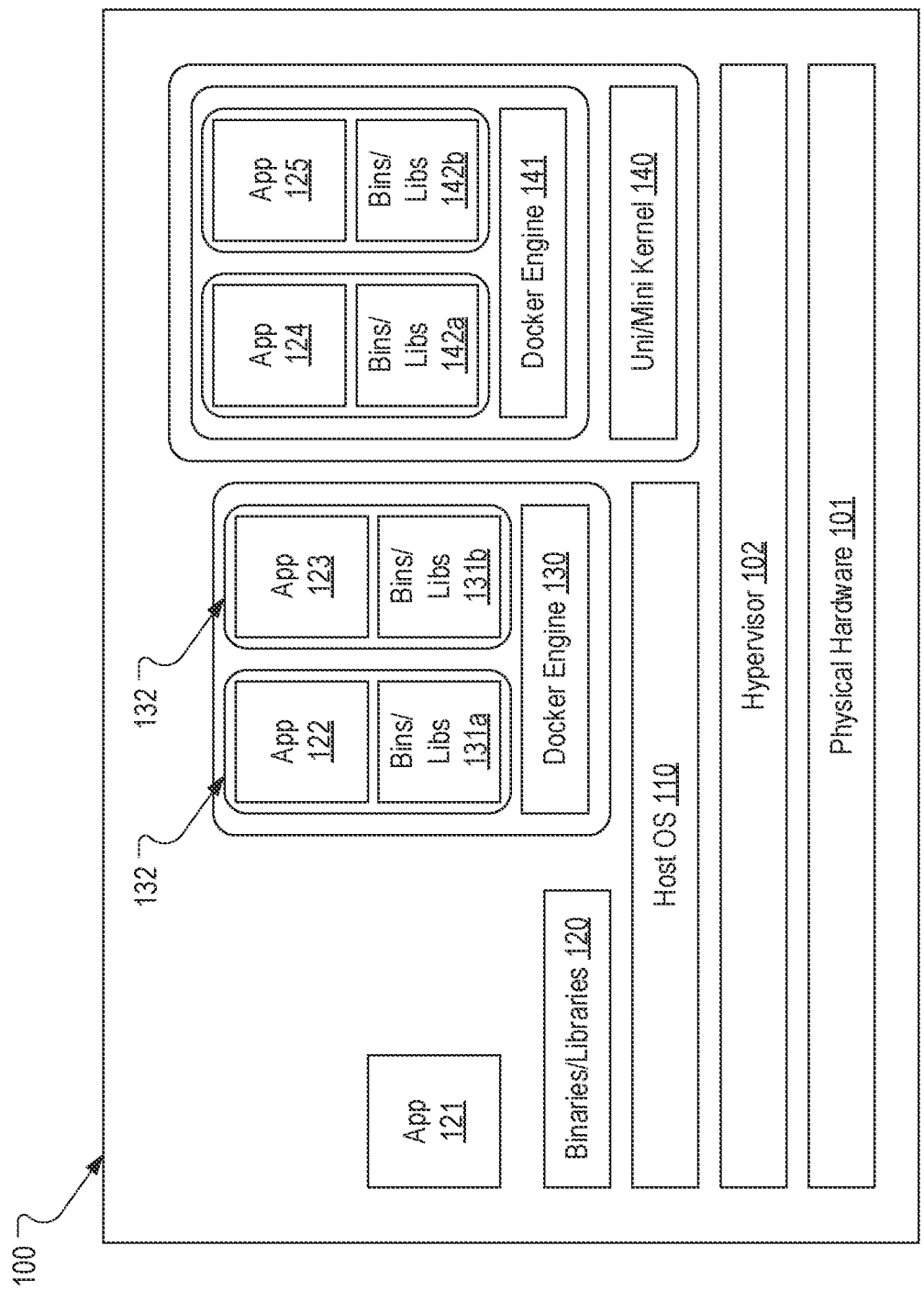
FIG. 1 provides examples of various types of containers that can be used to execute an application on a computing device.
Figure 2:
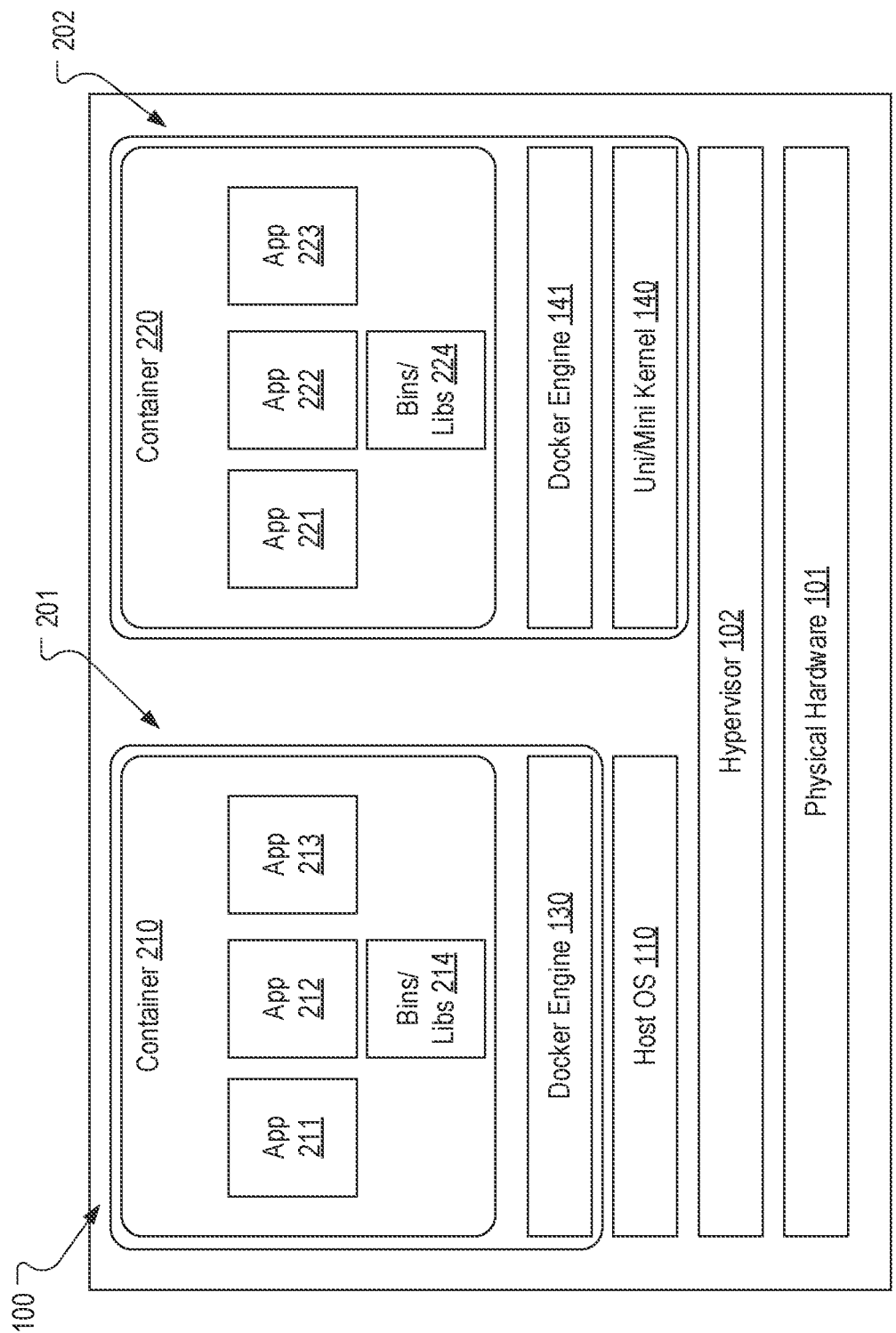
FIG. 2 provides an example of how workspaces can be implemented using containers.

FIG. 2 provides an example of how workspaces may be implemented on computing device 100. In this example, there is a software-based container 210 in which applications 211-213 are containerized along with their respective binaries and libraries 214. A particular theme could be applied to container 210 such that container 210 may constitute a workspace 201. In other words, each of applications 211-213 may be assigned to workspace 201 by virtue of their being containerized in container 210. Similarly, in this example, there is a hardware-based container 220 in which applications 221-223 are containerized along with their respective binaries and libraries 224. A particular theme could be applied to container 220 such that container 220 may constitute a workspace 202. In other words, each of applications 221-223 may be assigned to workspace 202 by virtue of their being containerized in container 220. Although not shown, a container could be deployed on a server to run one or more applications that are made accessible to computing device 100 (e.g., via VDI techniques including browser-based VDI techniques) and a particular theme could be applied to the server-deployed container such that the server-deployed container may constitute a particular workspace.

At any given time, one or more workspaces may be implemented on a computing device, including scenarios where the workspace is implemented by deploying a container on the computing device and scenarios where the workspace is implemented by deploying a container on a server and making applications running in the container accessible to the computing device. For example, in some cases, all applications deployed on a computing device may be assigned to the same workspace at a particular time. In other cases, a first set of one or more applications deployed on a computing device may be assigned to a first workspace and a second set of one or more applications deployed on the computing device may be assigned to a second workspace at a particular time. Accordingly, a wide variety of workspace configurations and scenarios may be encompassed by embodiments of the present invention. As described in U.S. patent application Ser. No. 17/343,567, which is incorporated herein by reference, an application can be assigned to a workspace dynamically based on context. As stated above, embodiments of the present invention can be implemented on a computing device that is also configured to dynamically assign an application to a workspace based on context.

Figure 3:
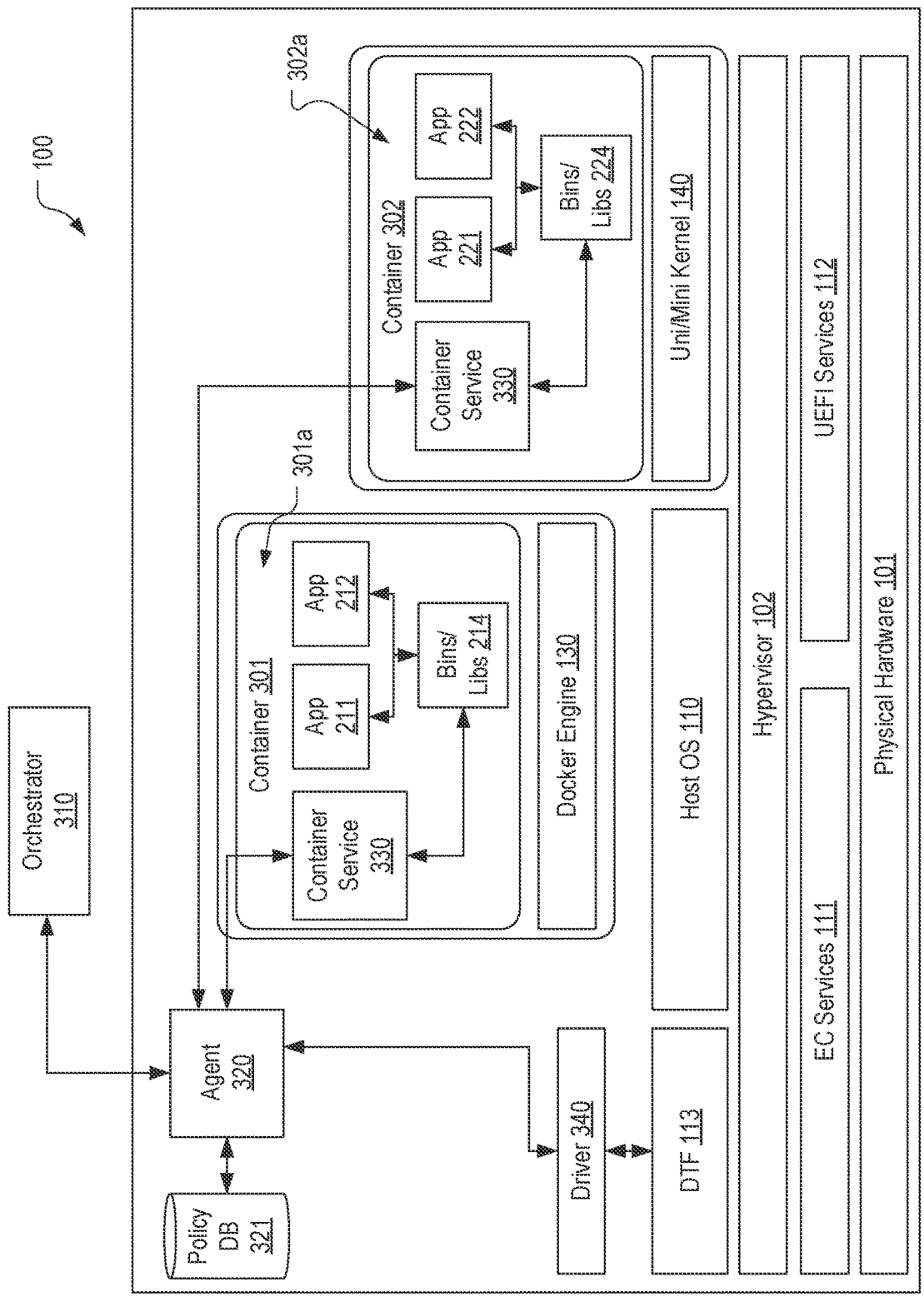
FIG. 3 provides an example of how a dynamic tuning solution may be implemented in one or more embodiments of the present invention.

FIG. 3, which is based on FIG. 2, provides an example of how a dynamic tuning solution may be configured to enable computing device 100's performance to be dynamically tuned for a containerized application. This dynamic tuning solution may include an orchestrator 310, an agent 320, a container service 330 in any container that may host an application for which the dynamic tuning solution may dynamically tune computing device 100's performance and a driver 340.

FIG. 3 also shows that a dynamic tuning framework (or DTF) 113 which can represent any user-mode and or kernel-mode component(s) which provide an interface or mechanism for the dynamic tuning solution to dynamically tune the performance of computing device 100. For example, DTF 113 could represent one or more components of the Intel Platform Framework and Dynamic Tuning Technology. However, embodiments of the present invention could be implemented when computing device 100 includes any other type or configuration of a dynamic tuning framework. DTF 113 can interface with embedded controller (EC) services 111 and/or Unified Extensible Firmware Interface (UEFI) services 112 to implement the dynamic tuning specified by the dynamic tuning solution (e.g., by setting CPU and GPU power levels, the battery discharge rate, etc.).

Orchestrator 310 may be a service or other component that runs on a server or other computing device that manages a number of computing devices 100. For example, in an enterprise environment, computing devices 100 may be used by employees, and an administrator may interface with orchestrator 310 to manage computing devices 100. Orchestrator 310 could also be used in any other environment. In some embodiments, orchestrator 310 may not be used, and the functionality that orchestrator 310 is described as performing may be performed by agent 320 or another component on computing device 100.

Agent 320 may be a service or another component that runs on any computing device 100 whose performance is to be dynamically tuned for a containerized application. Agent 320 can be configured to interface with orchestrator 310, each container service 330 and driver 340. Agent 320 may also maintain a policy database 321 in which it stores various data structures to be used in dynamically tuning computing device 100's performance for any containerized application such as applications 211, 212, 221 and 222.

An instance of container service 330 can be run in any container that may be launched on computing device 100 to host an application for which computing device 100's performance may be dynamically tuned. For example, container 301 may be launched to host applications 211 and 212 and may implement a workspace 301a, and container 302 may be launched to host applications 221 and 222 and may implement a workspace 302a. Container service 330 can be configured to interface with binaries/libraries 214 and 224 in containers 301 and 302 respectively.

Driver 340 may be a kernel mode component that interfaces with DTF 113. Driver 340 can be configured to interface with agent 320 to receive instructions for dynamically tuning computing device 100's performance and can interface with DTF 113 to cause the dynamic tuning to be carried out.

FIGS. 4A and 4B provide an example of various data structures that may be employed by a dynamic tuning solution to dynamically tune a computing device's performance for a containerized application. Although these data structures are represented as tables, embodiments of the present invention should not be limited to any particular structure or format of the data/information described herein. In some embodiments, orchestrator 310 may maintain and define tables 401-403 and agent 404 may create and update table 404 at runtime.

A dynamic tuning participant table 401 may be used to associate a participant ID with dynamic tuning parameters such as CPU power levels, GPU power levels, a battery discharge rate, etc. In this context, the term "participant ID" may be construed as an identifier of a set of dynamic tuning parameters. For example, DTF 113 may enable dynamic tuning parameters to be applied by specifying a participant ID. However, embodiments of the present invention encompass implementations where the dynamic tuning parameters are directly specified.

In the depicted example, dynamic tuning participant table 401 includes two entries, each of which can represent a different "performance level" to which computing device 100 may be tuned. A first entry associates the participant ID of ID1 with CPU power levels of 50W and 80W for PL1 and PL2 respectively, GPU power levels of 25W and 40W for PL1 and PL2 respectively and a battery discharge rate of 8 C. Accordingly, when DTF 113 is instructed to dynamically tune computing device 100 in accordance with ID1, it will cause the performance level represented by these CPU, GPU and battery dynamic tuning parameters to be applied.

A second entry associates the participant ID of ID2 with CPU power levels of 45 W and 75 W for PL1 and PL2 respectively, GPU power levels of 20 W and 35 W for PL1 and PL2 respectively and a battery discharge rate of 7.5 C and therefore represents a slightly lower performance level than the first entry. As represented by the ellipsis, dynamic tuning participant table 401 may have additional entries which could represent additional performance levels to which computing device 100 could by dynamically tuned.

An application context table 402 can define for each target application (i.e., for each application for which computing device 100's performance should be dynamically tuned) a context and a participant ID. In this example, it is assumed that there are two contexts, security and performance, but others could be used. By defining a participant ID, application context table 402 creates an association between each target application and the performance level that should be applied when the target application has focus (e.g., when the user is actively using the application). For this example, it is assumed that Word and Excel are to be run in a security context and are associated with the participant ID, ID2, while Zoom, Chrome and Solidworks are to be run in a performance context and are associated with the participant ID, ID1.

A workspace context table 403 can define, for each workspace (e.g., for each container that may host target applications), a context and a participant ID. In the depicted example, it is assumed that four workspaces may be implemented on computing device 100, Workspace1, Workspace2, Workspace3 and Workspace 4. Workspace1 is associated with the performance context and the participant ID, ID1. Workspace2 and Workspace3 are associated with the security context and the participant ID, ID2. Workspace4 is not associated with a context or a participant ID.

An application container table 404, which as described below agent 320 may create at runtime, can include an entry for each target application (or at least those that are running on computing device 100), where each entry can define the type of container in which the target application is running and can associate the target application with an execution ID. For example, it is assumed that Word and Excel are hosted in a hardware container and therefore their associated execution ID may be an identifier of the hardware container such as the virtual machine control structure (VMCS) identifier. On the other hand, it is assumed that Zoom and Solidworks are hosted in a software container and therefore their associated execution ID may be an identifier of the software container such as the process ID of the container. In this example, it is also assumed that the target applications may include native applications. For example, it is assumed that Chrome is not run in a container and therefore its associated execution ID may be its own process ID. Notably, Chrome could be used to provide access to applications that are containerized on a server (e.g., via an HTML5 VDI client).

FIGS. 5A-5D provide an example of how agent 320 can initiate the dynamic tuning of computing device 100's performance for containerized applications. This example is based on the example environment of FIG. 3 and the example tables in FIGS. 4A and 4B. Therefore, it is assumed that software container 301, which currently implements Workspace1, hosts applications 211 (Zoom) and 212 (Solidworks) and hardware container 302, which currently implements Workspace2, hosts applications 221 (Word) and 222 (Excel). However, the functionality described herein can be implemented for any arrangement of containers and any arrangement of application(s) within containers.

Figure 5A:
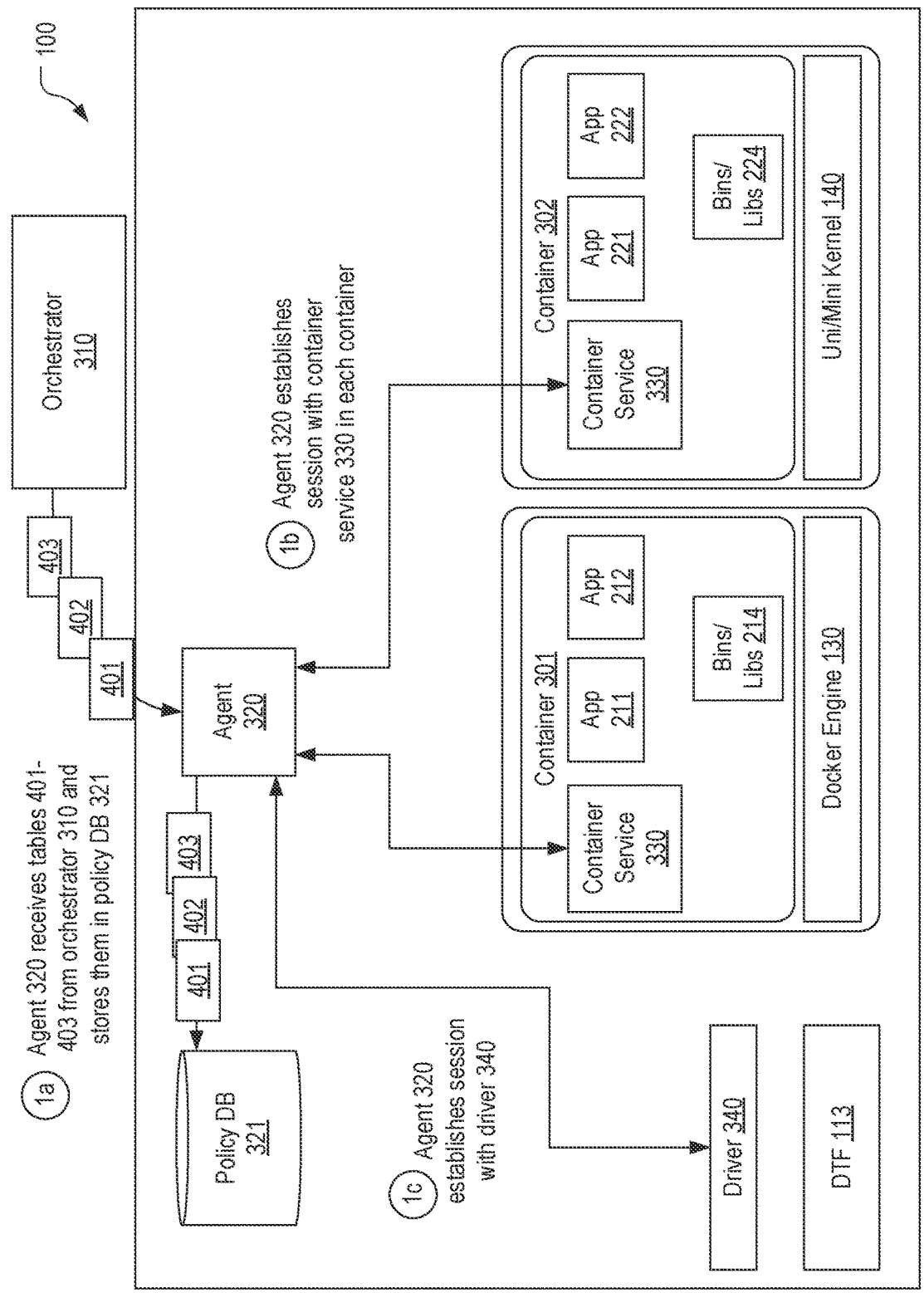
FIGS. 5A-5D provide an example of how a dynamic tuning solution can initiate the dynamic tuning of a computing device's performance for containerized applications in accordance with one or more embodiments of the present invention.

Turning to FIG. 5A, in step 1a, agent 320 can receive tables 401-403 from orchestrator 310 and store them in policy database 321. Accordingly, at this point, agent 320 may know the dynamic tuning parameters for each defined performance level, which performance level should be applied to each target application and which performance level should be applied to each workspace. In step 1b, agent 320 can establish a session with container service 330 in each container 301 and 302 (e.g., via network connections). In step 1c, agent 320 can establish a session with driver 340 (e.g., via IOCTLs). Agent 320 can use these sessions for subsequently communicating with container services 330 and driver 340.

Figure 5B:
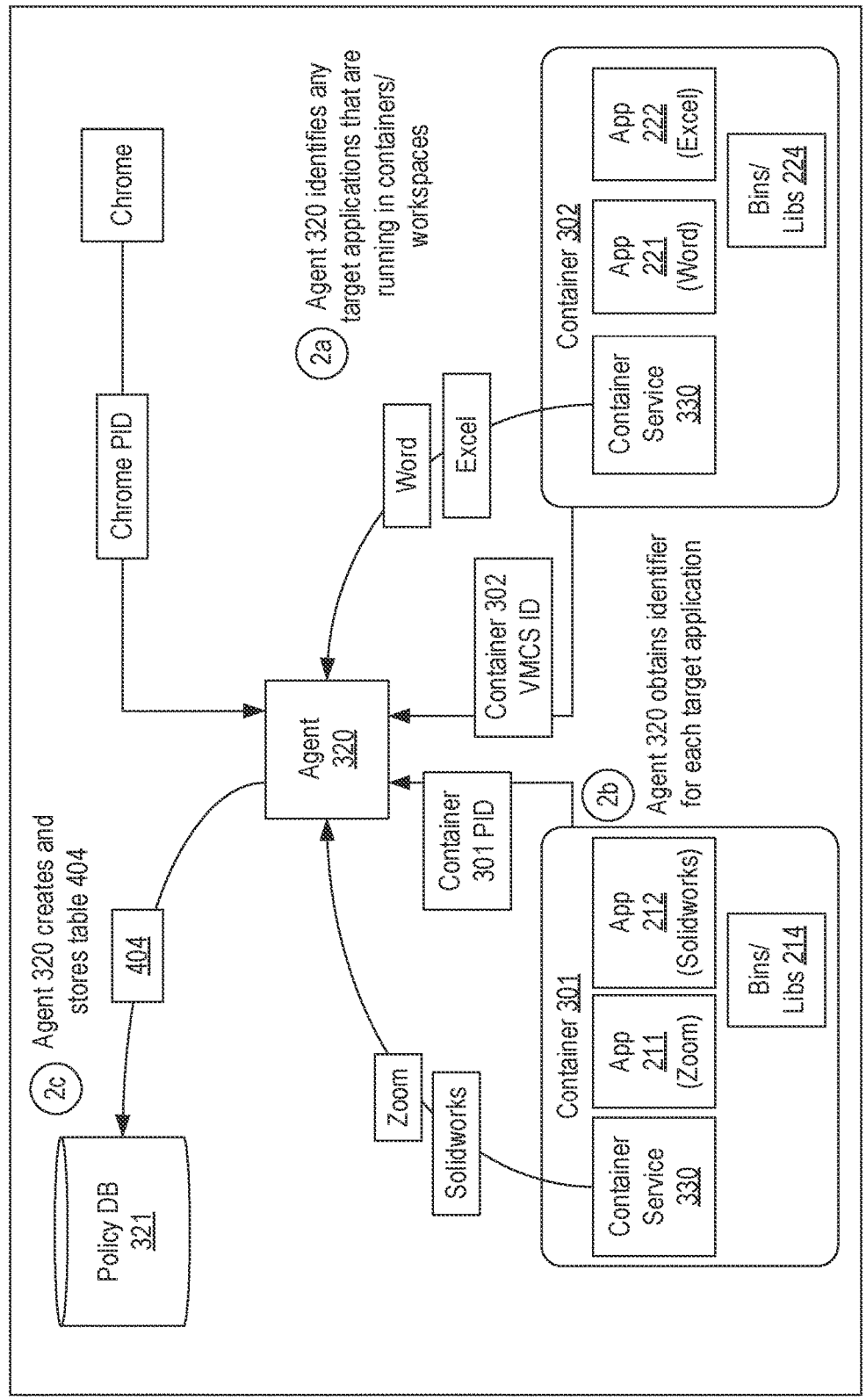

Turning to FIG. 5B, agent 320 can perform a number of steps to create application container table 404. In step 2a, agent 320 can communicate with container services 330 to identify which target applications are running in containers 301 and 302. In step 2b, agent 320 can obtain an execution ID for each target application. As described above, this execution ID depends on how (and if) the target application is containerized. For example, because Zoom and Solidworks are hosted in container 301, which is a software container, agent 320 could obtain the process ID of container 301 using any suitable technique and use this process ID as the execution ID for Zoom and Solidworks. Similarly, because Word and Excel are hosted in container 302, which is a hardware container, agent 320 can obtain the VMCS ID of container 302 and use this VMCS ID as the execution ID for Word and Excel. In contrast, because Chrome is a native application, agent 320 can retrieve Chrome's process ID and use the process ID as the execution ID for Chrome. With the information gathered in steps 2a and 2b, in step 2c, agent 320 can create and store application container table 404 in policy database 321.

Figure 5C:
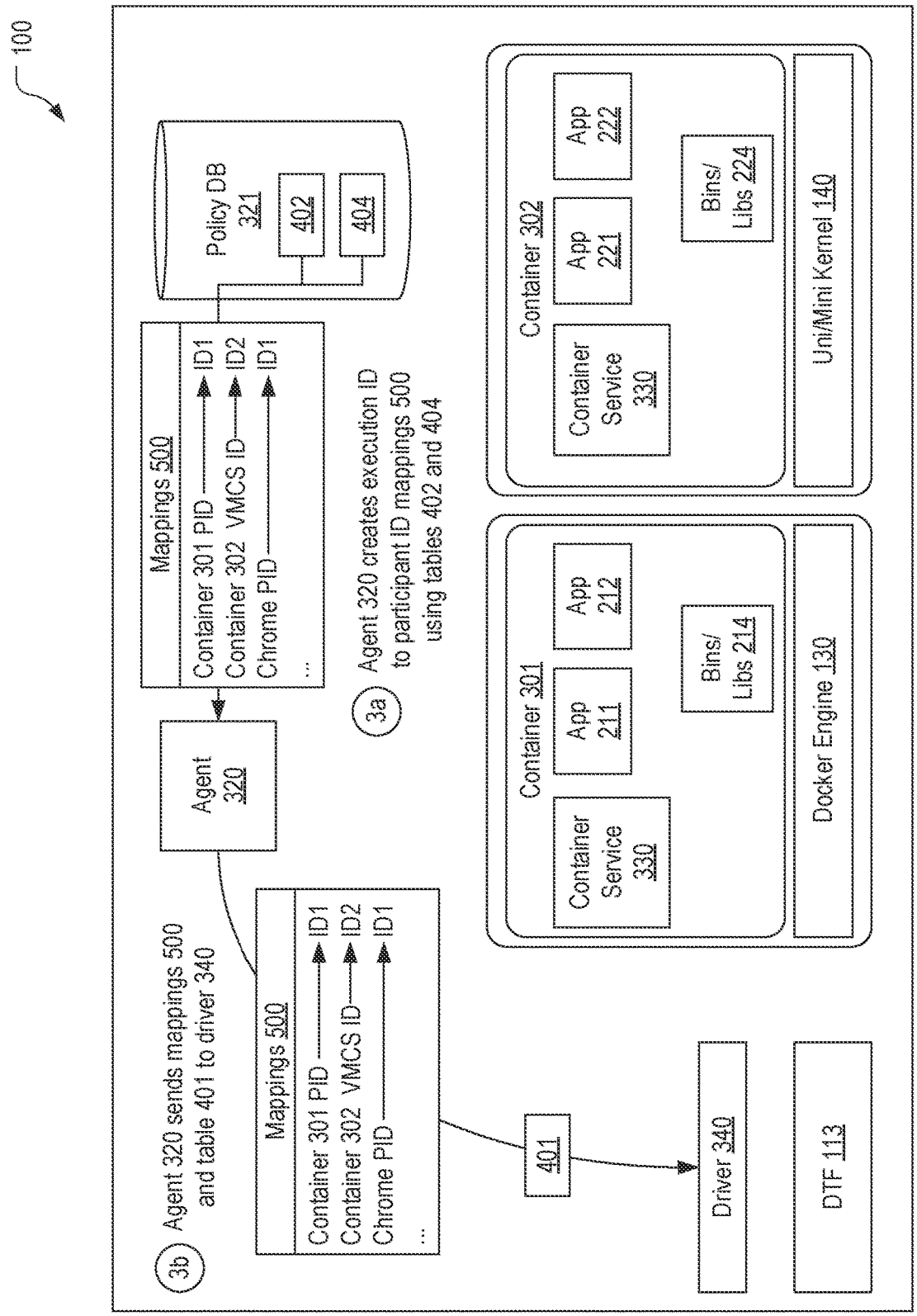

Turning to FIG. 5C, in step 3a, agent 320 can use tables 402 and 404 to create execution ID to participant ID mappings 500 (or mappings 500). For example, because application container table 404 defines container 301's PID as the execution ID for Zoom and Solidworks and because application context table 402 defines ID1 as the participant ID for Zoom and Solidworks, agent 320 can include a mapping between container 301's PID and ID1 in mappings 500. In step 3b, agent 320 can send mappings 500 and dynamic tuning participant table 401 to driver 340.

Figure 5D:
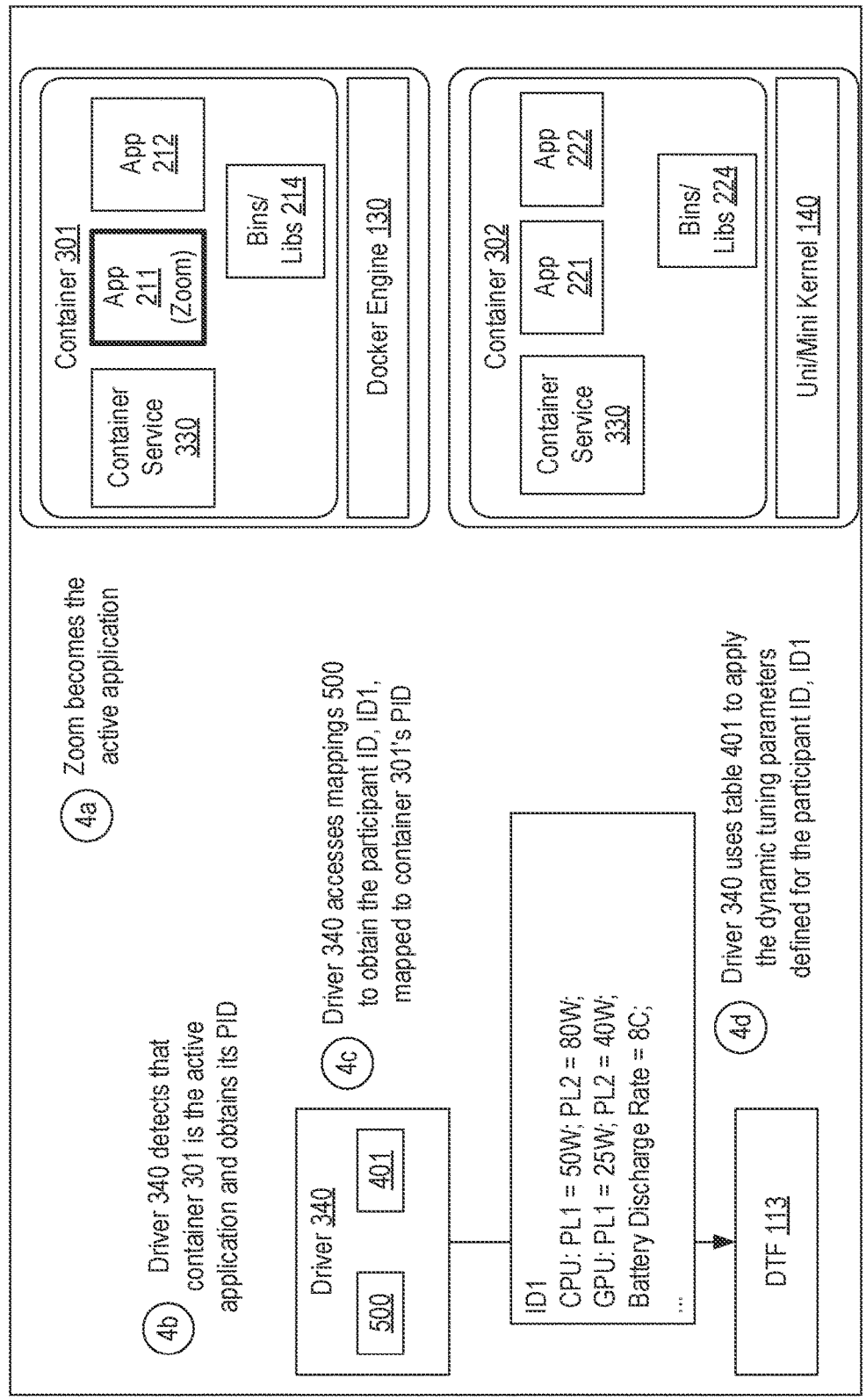

Turning to FIG. 5D, once driver 340 has received mappings 500 and dynamic tuning participant table 401, it can commence dynamically tuning computing device 100's performance for the target applications when the target applications are active even though they may be running within a container. For example, in step 5a, it is assumed that Zoom becomes the active application. For example, the user may cause Zoom's window to be in the foreground. In step 4b, driver 340 can detect that container 301 is the active application and can obtain its PID. For example, in a Windows-based implementation, driver 340 could call GetForegroundWindow to obtain a handle to the window that has focus and then call GetProcessID to obtain the PID of the window that has focus, which would be container 301's PID in this example. In step 4c, driver 340 can use the PID obtained in step 4b as the execution ID for retrieving a mapped participant ID from mappings 500, which would be ID1 in this example. Next, in step 4d and using the identified participant ID, driver 340 can use table 401 to cause DTF 113 to apply the performance level (or dynamic tuning parameters) defined for the participant D.

Driver 340 can repeat steps 4a-4d if an application hosted outside of container 301 becomes the active application. For example, if Word becomes active in place of Zoom, steps 4a-4d would be repeated to thereby cause the performance level defined for the participant ID, ID2, to be applied. When a hardware container hosts the active application, step 4b could entail detecting that the virtual machine that implements the hardware container has focus and obtaining the identifier of the virtual machine.

Figure 6A:
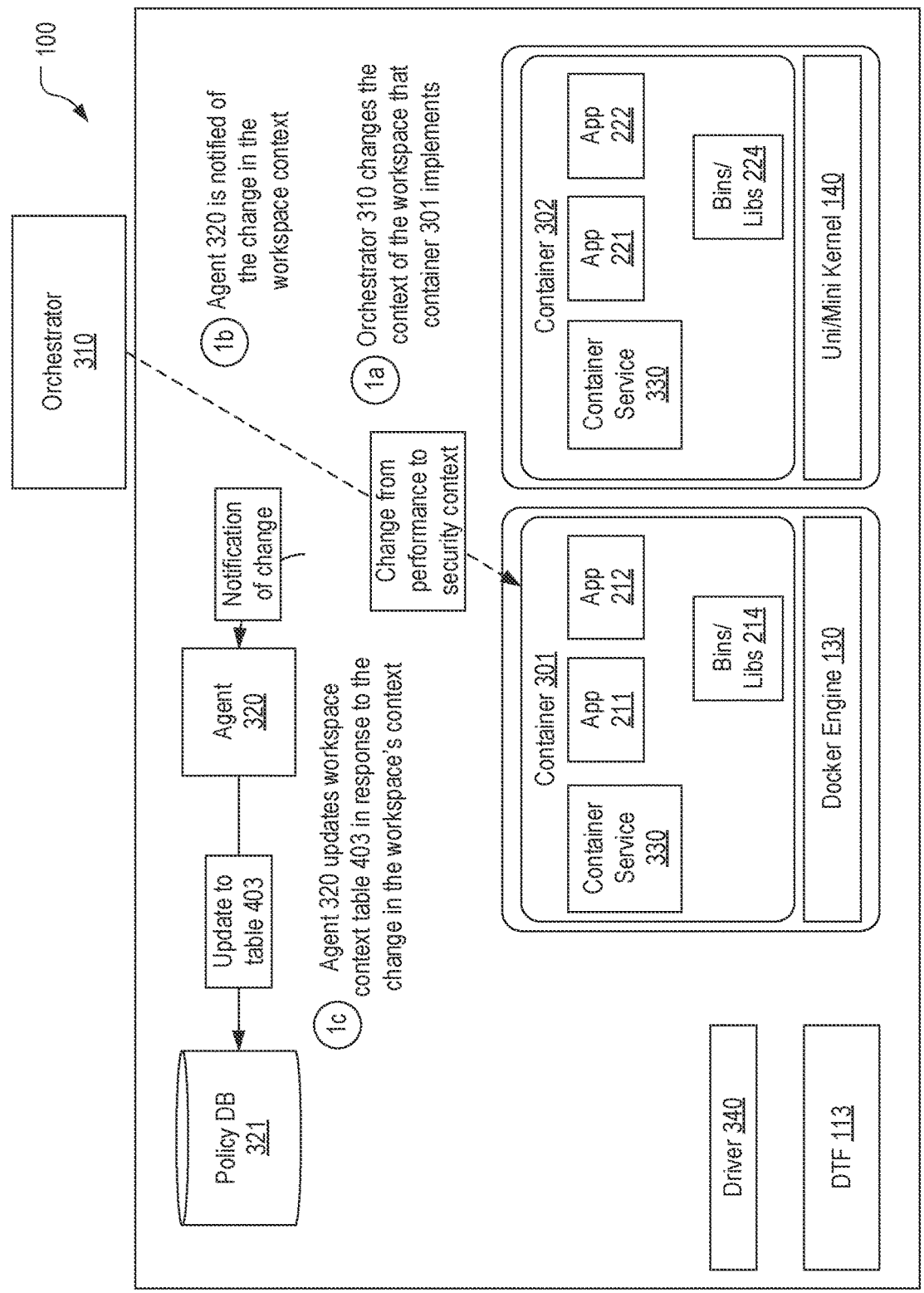
FIGS. 6A-6C provide an example of how a dynamic tuning solution can adjust the dynamic tuning of a computing device's performance when the context of a workspace is changed in accordance with one or more embodiments of the present invention.
Figure 6B:
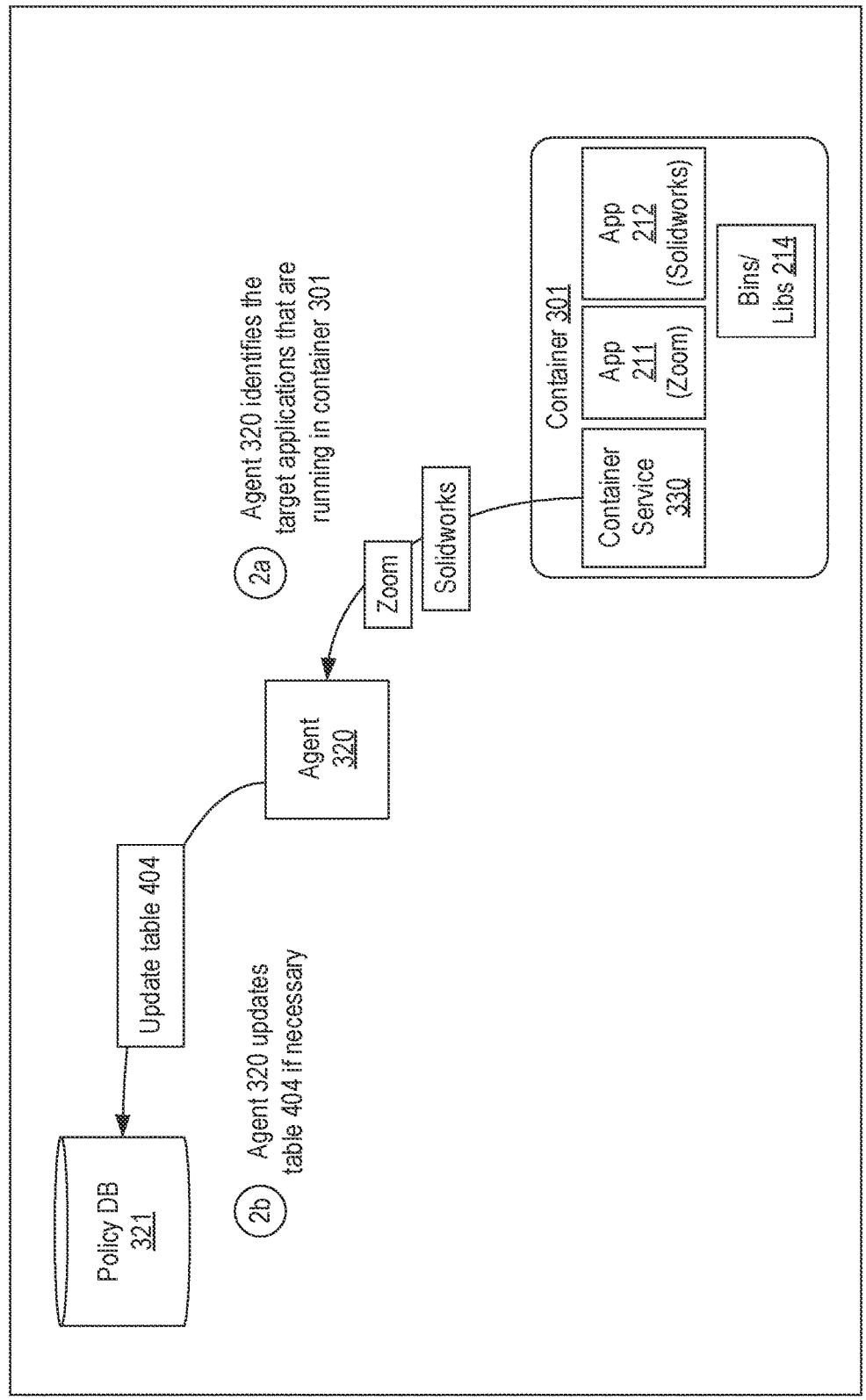
Figure 6C:
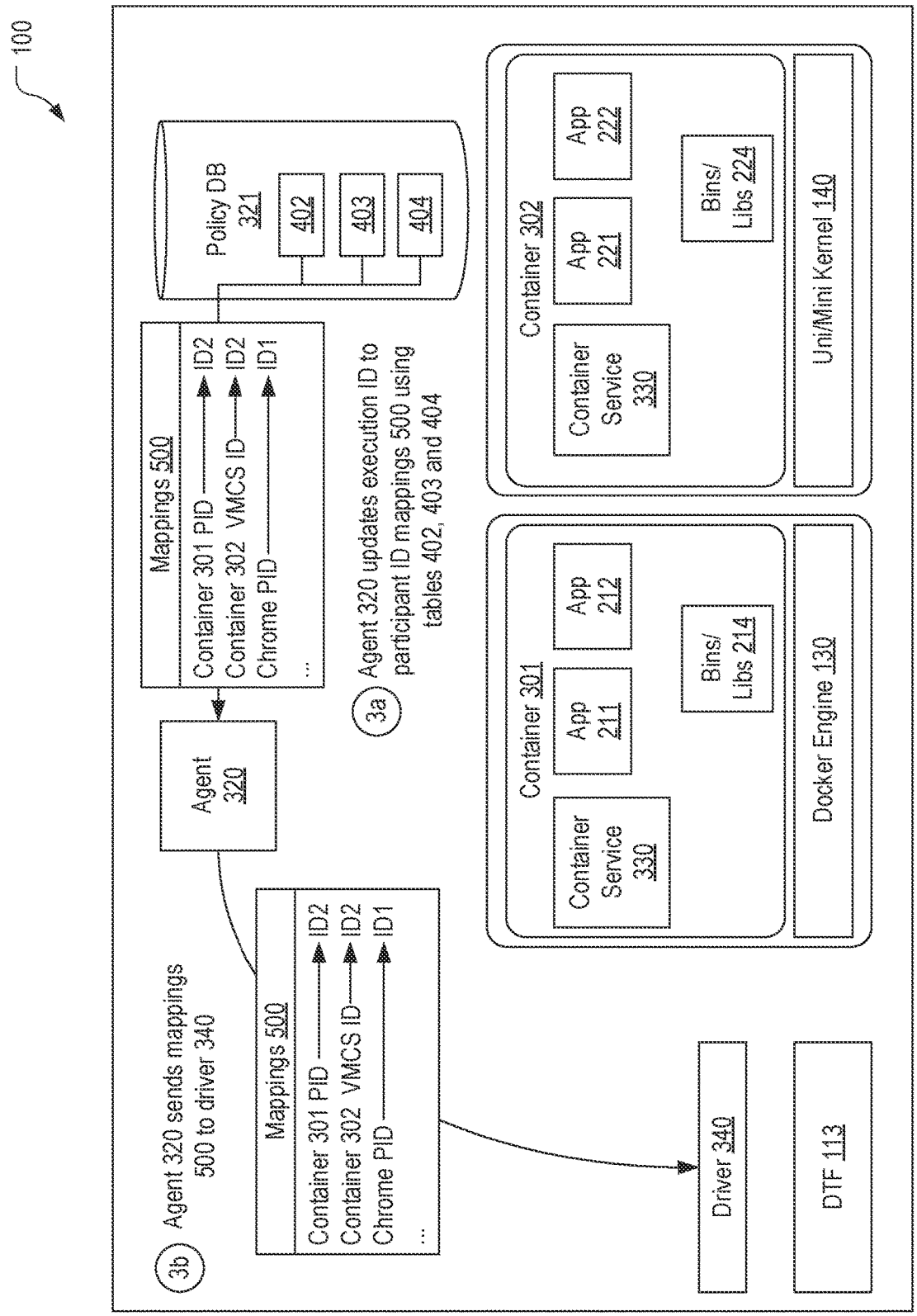

FIGS. 6A-6C provide an example of how agent 320 can update mappings 500 in response to a change in the context of a workspace/container that hosts target applications. As represented as step 1a in FIG. 6A, it is assumed that orchestrator 310 causes the context of the workspace that container 301 implements (Workspace1) to be changed from performance to security. For example, orchestrator 310 could detect that computing device 100 has connected to a public network as opposed to a corporate network and therefore concluded that container 301 should host applications 211 and 212 with greater security. In step 1b, agent 320 can be notified of or otherwise detect this change in context of Workspace1. For example, a component on computing device 100 that is tasked with implementing the change in context could notify agent 320. In step 1c, agent 320 can update workspace context table 403 to reflect the change in Workspace1's context. For example, with reference to FIG. 4B, the context for the Workspace1 entry could be changed to Security and the participant ID could be changed to ID2.

Turning to FIG. 6B, in step 2a, agent 320 could interface with container service 330 to identify which applications are hosted in container 301. In this example, it is assumed that Zoom and Solidworks remain hosted in container 301. However, in some instances, an application could be terminated or added to a workspace in conjunction with changing the workspace's context. In step 2b, agent 320 can update application container table 404 as necessary to associate each application running in the workspace with the changed context with the appropriate execution ID. In this example, given that the same applications are running in container 301, no changes are made to application container table 404.

Turning to FIG. 6C, after agent 320 has updated tables 403 and 404, in step 3a, agent 320 can use tables 402, 403 and 404 to create/update mappings 500. In particular, given the change in context of the workspace in which target applications may be running, there may be a conflict between the participant ID that is associated with a target application and the participant ID that is associated with the workspace in which the target application is running. In the current example, application context table 402 associates Zoom and Solidworks with the participant ID, ID1, whereas workspace context table 403 has been updated to associate Workspace1 with the participant ID, ID2. In such a case, agent 320 can select the participant ID associated with the workspace to be mapped to the execution ID for the applications running in the workspace. For example, FIG. 6C shows that container 301 PID is mapped to ID2, the participant ID currently associated with Workspace1, as opposed to ID1, the participant ID associated with Zoom and Solidworks. It is assumed that no changes have been made to the context of Workspace2 (container 302) or to Chrome and therefore mappings 500 are otherwise the same as in FIG. 5C.

In step 3b, agent 320 can send mappings 500 as updated to driver 340. At this point, driver 340 can commence using mappings 500 as updated to perform steps 4a-4d as shown in FIG. 5D. For example, if Zoom or Solidworks becomes active, driver 340 can use mappings 500 to cause computing device 100's performance to be dynamically tuned in accordance with the performance level defined for participant ID, ID2.

Figure 7A:
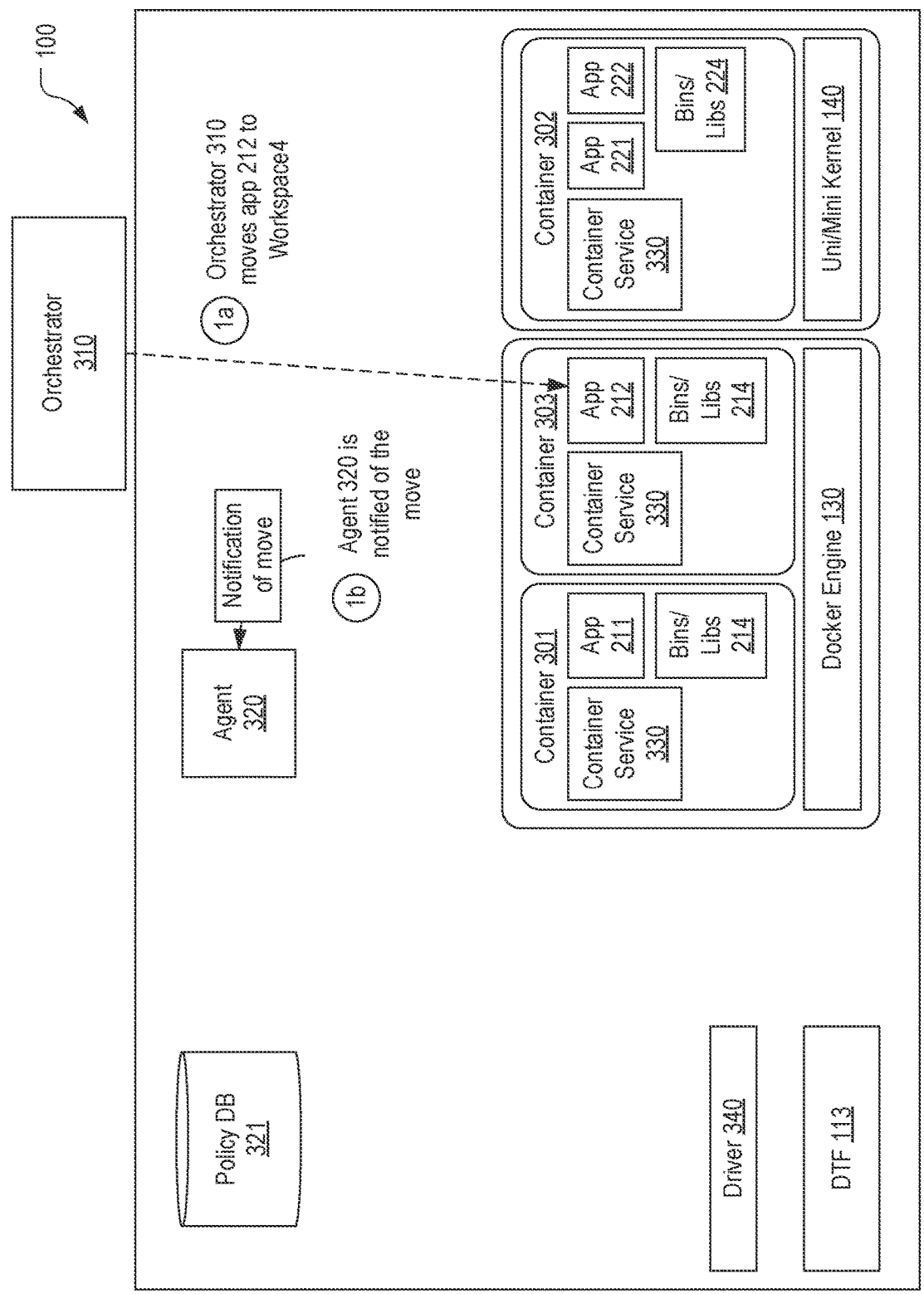
FIGS. 7A-7C provide an example of how a dynamic tuning solution can adjust the dynamic tuning of a computing device's performance when a containerized application is moved between workspaces in accordance with one or more embodiments of the present invention.
Figure 7B:
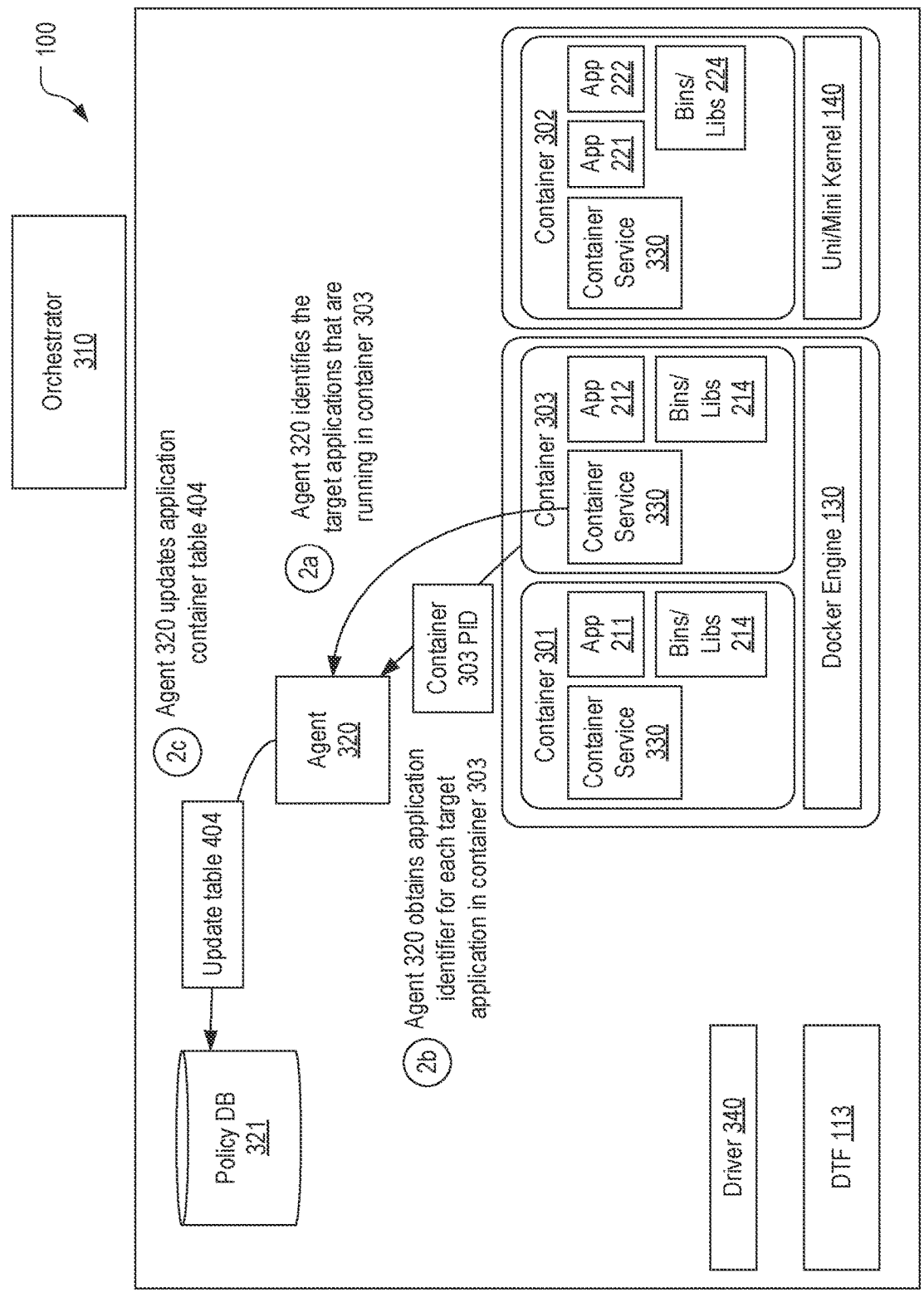
Figure 7C:
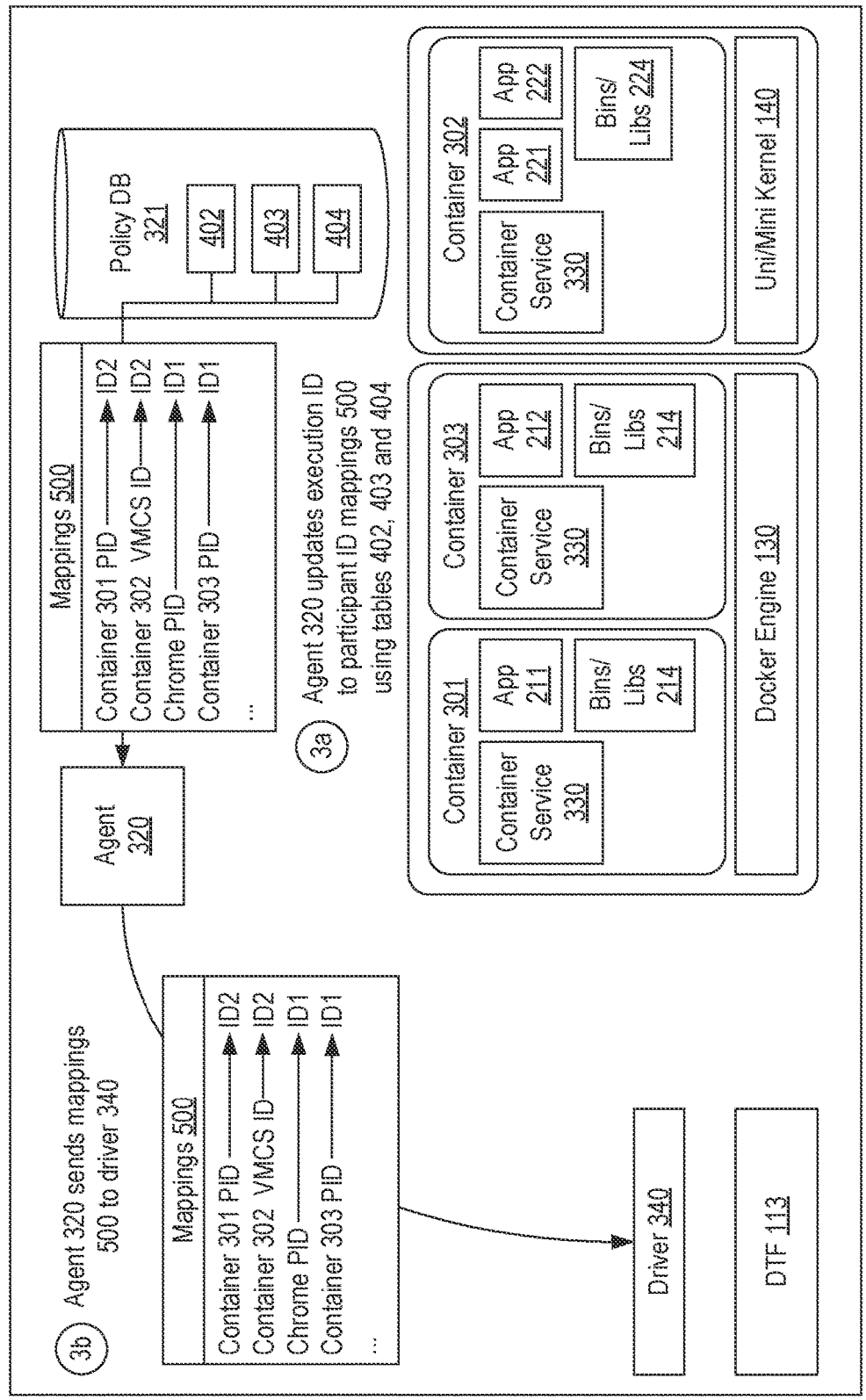

FIGS. 7A-7C provide an example of how agent 320 can update mappings 500 in response to an application being moved to a different workspace. As represented as step 1a in FIG. 7A, it is assumed that orchestrator 310 causes application 212 (Solidworks) to be moved from Workspace1 (container 301) to Workspace4 (container 303). In step 1b, agent 320 can be notified of or otherwise detect this move.

Turning to FIG. 7B, in step 2a, agent 320 could interface with container service 330 in container 303 to identify which applications are hosted in container 303. In this example, it is assumed that only Solidworks is hosted in container 303. In step 2b, agent 320 can obtain an execution ID for each application hosted in container 303. Because container 303 is a software container, step 2b may entail obtaining the process ID of container 303 and using it as the execution ID for Solidworks. In step 2c, agent 320 can update application container table 404. In this example, this update could entail changing the execution ID associated with Solidworks from Container 301 PID to Container 303 PID.

Turning to FIG. 7C, after agent 320 has updated application context table 404, in step 3a, agent 320 can use tables 402, 403 and 404 to create/update mappings 500. In particular, when a target application is moved from one workspace to another, there may be a conflict between the participant ID that is associated with a target application and the participant ID that is associated with the workspace to which the target application was moved. In the current example, application context table 402 associates Solidworks with the participant ID, ID1, whereas workspace context table 403 does not associate Workspace4 with a participant ID. In such a case, agent 320 can select the participant ID associated with the target application, Solidworks. For example, FIG. 7C shows that container 303 PID is mapped to ID1, the participant ID associated with Solidworks. If the workspace to which an application is moved is associated with a participant, agent 320 could select the participant ID associated with the workspace rather than the participant ID associated with the moved application.

In step 3b, agent 320 can send mappings 500 as updated to driver 340. At this point, driver 340 can commence using mappings 500 as updated to perform steps 4a-4d as shown in FIG. 5D. For example, if Solidworks becomes active, driver 340 can detect that container 303 is active, obtain its process ID, container 303 PID, use the process ID to obtain the appropriate participant ID, ID1, from mappings 500 and then cause computing device 100's performance to be dynamically tuned in accordance with the dynamic tuning parameters defined for the participant ID, ID1.

As can be seen, a dynamic tuning solution configured in accordance with embodiments of the present invention can dynamically tune a computing device for a containerized application using a common technique even when the context of the workspace/container is changed and when the containerized application is moved to a different container. As a result, dynamic tuning and containerization can be concurrently implemented in a scalable manner.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically tuning a computing device's performance for a containerized application, the method comprising:
    executing an agent on a computing device, the agent being executed outside of any container hosted on the computing device;
    detecting, by the agent, a first container hosted on the computing device;
    establishing, by the agent, a session with a container service executing within the first container, the session being established using network communications between the agent and the container service;
    identifying, by the agent and via the network communications, one or more applications that are hosted in the first container;
    identifying, by the agent, an execution ID for the first container;
    associating, by the agent, the execution ID for the first container with a first performance level, the first performance level defining one or more of power levels for a CPU, power levels for a GPU, or a battery discharge rate;
    sending, by the agent, the associated execution ID and first performance level to a driver of a dynamic tuning framework;
    using, by the driver, the execution ID for the first container to detect when the one or more applications are active on the computing device, wherein detecting when the one or more applications are active on the computing device comprises determining that a window in a foreground matches the execution ID; and
    in response to detecting when the one or more applications are active on the computing device, causing, by the driver, the computing device's performance to be dynamically tuned to the first performance level that is associated with the execution ID such that the one or more of the power levels for the CPU, the power levels for the GPU, or the battery discharge rate defined by the first performance level are applied on the computing device while the one or more applications are active.

2. The method of claim 1, wherein the execution ID for the first container is a process ID of the first container.

3. The method of claim 1, wherein the execution ID for the first container is an identifier of a virtual machine.

4. The method of claim 1, wherein the agent associates the execution ID for the first container with the first performance level in response to determining that the first performance level is associated with the one or more applications.

5. The method of claim 1, wherein the agent associates the execution ID for the first container with the first performance level in response to determining that the first performance level is associated with a context of a workspace that the first container implements.

6. The method of claim 1, wherein the first container implements a workspace that is associated with a first context, the method further comprising:
    detecting, by the agent, that the workspace has been updated to be associated with a second context;
    associating, by the agent, the execution ID for the first container with a second performance level, the second performance level being associated with the second context;
    sending, by the agent, the associated execution ID and second performance level to the driver of the dynamic tuning framework;
    after the workspace has been updated to be associated with the second context, using, by the driver, the execution ID for the first container to detect when the one or more applications are active on the computing device; and
    in response to detecting when the one or more applications are active on the computing device after the workspace has been updated to be associated with the second context, causing, by the driver, the computing device's performance to be dynamically tuned to the second performance level.

7. The method of claim 1, further comprising:
    detecting, by the agent, that a first application of the one or more applications has been moved from the first container to a second container;
    identifying, by the agent, an execution ID for the second container;
    associating, by the agent, the execution ID for the second container with a second performance level;
    sending, by the agent, the associated execution ID for the second container and second performance level to the driver of the dynamic tuning framework;
    using, by the driver, the execution ID for the second container to detect when the first application is active on the computing device; and
    in response to detecting when the first application is active on the computing device, causing, by the driver, the computing device's performance to be dynamically tuned to the second performance level.

8. The method of claim 7, wherein the second performance level is different from the first performance level.

9. The method of claim 7, wherein the first container implements a first workspace that is associated with a first context and the second container implements a second workspace that is associated with a second context, the second context being associated with the second performance level.

10. The method of claim 7, wherein the second performance level is associated with the first application.

11. The method of claim 7, wherein the second container implements a second workspace that is not associated with a performance level and the first application is associated with the second performance level.

12. The method of claim 1, wherein causing the computing device's performance to be dynamically tuned to the first performance level comprises interfacing with the dynamic tuning framework.

13. The method of claim 1, wherein associating the execution ID for the first container with the first performance level comprises associating the execution ID for the first container with a participant ID for the first performance level.

14. The method of claim 1, wherein the first performance level comprises each of: the power levels for the CPU, the power levels for the GPU and the battery discharge rate.

15. A computing device comprising:
    a CPU;
    a GPU; and
    computer storage media storing computer executable instructions which when executed implement an agent, a container service that executes in a container with one or more applications and a driver of a dynamic tuning framework, wherein the agent, the container service and the driver are configured to perform a method for dynamically tuning the CPU and the GPU for the one or more applications, the method comprising:

executing the agent on the computing device, the agent being executed outside of any container hosted on the computing device;

detecting, by the agent, a first container hosted on the computing device;

establishing, by the agent, a session with a container service executing within the first container, the session being established using network communications between the agent and the container service;

identifying, by the agent and via the network communications, one or more applications that are hosted in the first container;

identifying, by the agent, an execution ID for the first container;

determining that the first container has a first context, identifying a first performance level that is associated with the first context;

in response to identifying that the first performance level is associated with the first context, associating, by the agent, the execution ID for the first container with the first performance level, the first performance level defining power levels for a CPU, power levels for a GPU, and a battery discharge rate;

sending, by the agent, the associated execution ID and first performance level to a driver of a dynamic tuning framework;

using, by the driver, the execution ID for the first container to detect when the one or more applications are active on the computing device, wherein detecting when the one or more applications are active on the computing device comprises determining that a window in a foreground matches the execution ID; and in response to detecting when the one or more applications are active on the computing device, causing, by the driver, the computing device's performance to be dynamically tuned to the first performance level that is associated with the execution ID such that the power levels for the CPU, the power levels for the GPU, and the battery discharge rate defined by the first performance level are applied on the computing device while the one or more applications are active.

16. The computing device of claim 15, wherein the driver is a kernel-mode component.

17. The computing device of claim 15, wherein the container implements a workspace that is associated with a first context, the method further comprising:

detecting, by the agent, that the workspace has been updated to be associated with a second context;

creating, by the agent, an updated mapping between the execution ID for the container and a second performance level, the second performance level being associated with the second context; and providing, by the agent, the updated mapping to the driver to thereby enable the driver to cause the CPU and the GPU to be dynamically tuned to the second performance level when the driver detects, using the execution ID for the container, when the one or more applications are active on the computing device.

18. The computing device of claim 15, wherein the method further comprises:

detecting, by the agent, that a first application of the one or more applications has been moved from the container to a second container;

identifying, by the agent, an execution ID for the second container;

creating, by the agent, a second mapping between the execution ID for the second container with a second performance level; and providing, by the agent, the second mapping to the driver to thereby enable the driver to cause the CPU and the GPU to be dynamically tuned to the second performance level when the driver detects, using the execution ID for the second container, when the first application is active on the computing device.

19. One or more computer storage media storing computer executable instructions which when executed implement a method for dynamically tuning a computing device's performance for a containerized application, the method comprising:

executing an agent on the computing device, the agent being executed outside of any container hosted on the computing device;

detecting, by the agent, a first container hosted on the computing device;

establishing, by the agent, a session with a container service executing within the first container, the session being established using network communications between the agent and the container service;

identifying, by the agent and via the network communications, one or more applications that are hosted in the first container;

identifying, by the agent, an execution ID for the first container;

associating, by the agent, the execution ID for the first container with a first performance level, the first performance level defining one or more of power levels for a CPU, power levels for a GPU, or a battery discharge rate;

sending, by the agent, the associated execution ID and first performance level to a driver of a dynamic tuning framework;

using, by the driver, the execution ID for the first container to detect when the one or more applications are active on the computing device, wherein detecting when the one or more applications are active on the computing device comprises determining that a window in a foreground matches the execution ID;

in response to detecting when the one or more applications are active on the computing device, causing, by the driver, the computing device's performance to be dynamically tuned to the first performance level that is associated with the execution ID such that the one or more of the power levels for the CPU, the power levels for the GPU, or the battery discharge rate defined by the first performance level are applied on the computing device while the one or more applications are active;

detecting that the computing device has been connected to a public network;

determining that the first container has been associated with a different context in response to the computing device being connected to the public network;

determining that the different context is associated with a second performance level;

associating the execution ID for the first container with the second performance level;

sending, by the agent, the associated execution ID and second performance level to the driver of the dynamic tuning framework;

using, by the driver, the execution ID for the first container to detect when the one or more applications are active on the computing device; and in response to detecting when the one or more applications are active on the computing device, causing, by the driver, the computing device's performance to be dynamically tuned to the second performance level such that the computing device's performance is dynamically tuned in response to the first container being associated with the different context in response to the computing device being connected to the public network.

20. The computer storage media of claim 19, wherein the execution ID is one of a process ID of the first container or an identifier of a virtual machine.

\* \* \* \* \*